Patented May 23, 1944

2,349,796

UNITED STATES PATENT OFFICE 2,349,796

DERIVATIVES OF 2,4-OXAZOLIDINEDIONE

Roger W. Stoughton, Ferguson, Mo., assignor to Mallinckrodt Chemical Works, St. Louis, Mo., a corporation of Missouri No Drawing. Application January 14, 1942,
Serial No. 426,784

4 Claims. (Cl. 260—307)

This invention relates to new derivatives of 2,4-oxazolidinedione, and with regard to certain more specific features, to such derivatives which represent substitutions in the 5-position by two alkyl radicals, one of which contains at least three carbon atoms.

This application is a continuation-in-part of my copending application Serial No. 318,321, filed February 10, 1940.

Among the several objects of this invention may be noted the provision of new chemical compounds which are 5-substituted derivatives of 2,4-oxazolidinedione, and their alkali and alkaline earth metal salts, useful as hypnotics, sedatives, and narcotics, and the provision of new intermediates for the preparation of these compounds. Other objects will be in part obvious and in part pointed out hereinafter.

The invention accordingly comprises the elements and combinations of elements, the proportions thereof, and features of composition, which will be exemplified in the substances and products hereinafter described, and the scope of the application of which will be indicated in the following claims.

The compounds included in this invention may be represented by the following type formula:

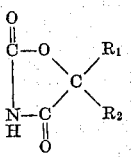

in which R₁ is an alkyl radical and R₂ is an alkyl radical containing six or seven carbon atoms.

Throughout the specification and claims where the term alkyl appears, it will be understood that radicals of the class of saturated open-chain hydrocarbon radicals and cyclo-paraffin radicals are referred to.

Example 1

Typical of the compounds included in the present invention is the 5-methyl-5-n-hexyl derivative of 2,4-oxazolidinedione. This compound may be represented by the following structural formula:

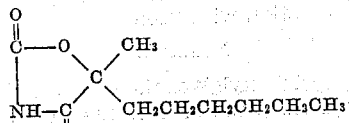

and may be prepared in the following manner:

A mixture of 0.2 mol of ethyl α-n-hexyl-α-methyl-α-hydroxyacetate (prepared, for example, by the hydrolysis and subsequent esterification of the cyanohydrin of methyl n-hexylketone or, as described in Example 6, post) with 0.25 mol of dry urea is dissolved in 100 ml. of a 2.5 normal solution of sodium ethylate in absolute alcohol. The mixture is heated under a reflux for from ten to twelve hours, after which the alcohol is distilled off under reduced pressure, and the residue dissolved in a minimum amount of cold water. The unreacted ester is then extracted with ether, the extracted aqueous solution is then acidified, and an oil separates out. This oil is purified by distillation under reduced pressure, and is recrystallized from petroleum ether. The product 5-methyl-5-n-hexyl-2,4-oxazoledione is obtained as a colorless solid which melts at 46–47° C., and boils at from 161 to 163° C. under 5 mm. pressure. It is insoluble in cold water and cold petroleum ether, but is easily soluble in alcohol, ether, benzene and warm petroleum ether.

Example 2

5-methyl-5-n-heptyl - 2,4 - oxazolidinedione is obtained by substituting for the ester in Example 1, ethyl α-n-heptyl-α-methyl-α-hydroxyacetate. The product crystallizes from petroleum ether in the form of fine colorless needles, which melt at 32° C. and boil at 154 to 158° C. under 2 mm. pressure. They are insoluble in water and cold petroleum ether, but are soluble in alcohol, ether, benzene and warm petroleum ether.

Example 3

5-ethyl-5-cyclohexyl - 2,4 - oxazolidinedione is obtained by substituting for the ester in Example 1, ethyl α-cyclohexyl-α-ethyl-α-hydroxyacetate. The product crystallizes from dilute methanol as iridescent plates which melt at 100 to 101° C. It is insoluble in water and petroleum ether, but soluble in alcohol, ether and benzene.

Example 4

5-ethyl-5-n-hexyl-2,4-oxazolidinedione is prepared as follows: Sodium metal (4.3 g.) was dissolved in dry methyl alcohol (50 ml.) in a three-necked, 500 ml. flask, fitted with a reflux condenser and a mercury sealed stirrer. To the cooled solution was added a solution of α-ethyl-α-hydroxy-caprylamide (32 g.) and diethyl carbonate (22 g.) in methyl alcohol (10 ml.) over a five minute period. The reaction mixture was refluxed for four hours. After the alcohol had been distilled off at atmospheric pressure, the cooled residue was dissolved in ice water (200 ml.) and the resulting yellowish solution extracted with three 50 ml. portions of isopropyl ether. The aqueous solution was next treated with about one gram of bonecoal and after filtering, the colorless clear solution was acidified with hydrochloric acid. The precipitated oil was taken up in ether and distilled in a Claisen flask under reduced pressure. The fraction boiling at 149–151° C. at 3 mm. pressure was collected and amounted to 29 g. (80%) of essentially pure 5-ethyl-5-n-hexyl-2,4-oxazolidinedione. On standing over night it solidified to a solid which melted at 30–31° C. Recrystallization from petroleum ether raised the melting point only one degree, (to 31–32° C. uncorrected) with a 70% recovery.

*Example 5*

5-ethyl-5-n-heptyl-2,4-oxazolidinedione is prepared in the following manner: Sodium metal (4.3 g.) was dissolved in dry methyl alcohol (50 ml.) in a three-necked, 500 ml. flask, fitted with a reflux condenser and a mercury sealed stirrer. To the cooled solution was added a solution of α-ethyl-α-hydroxy pelargonamide (38.5 g.) in diethyl carbonate (23 g.) over a ten minute period. The reaction mixture was refluxed for six hours. After the alcohol had been distilled off at atmospheric pressure, the cooled residue was dissolved in ice water (200 ml.) and the resultant yellowish solution extracted with three 50 ml. portions of isopropyl ether. The aqueous solution was next treated with about 1 g. of bonecoal, and after filtering, the clear, colorless solution was acidified with hydrochloric acid. The precipitated oil was taken up in ether and distilled in a Claisen flask under reduced pressure. The fraction boiling at 147–149° C. at 2 mm. pressure was collected and amounted to 28 g. (65%) of a colorless, viscous oil. This was essentially pure 5-ethyl-5-n-heptyl-2,4-oxazolidinedione. It was finally purified by recrystallization from petroleum ether and melted at 51–52° C. It is soluble in most common organic solvents, but insoluble in water and cold petroleum ether.

As has been indicated above, the ester which is condensed with urea to prepare the oxazolidinedione compounds described above may be conveniently obtained by the hydrolysis and subsequent esterification of the cyanohydrin of the corresponding dialkylketone. In some instances, however, it may be more convenient to obtain the material for the urea condensation in other manners.

*Example 6*

Ethyl α-n-hexyl-α-methyl-α-hydroxyacetate is prepared as follows: In a one-liter three-necked flask fitted with a mechanical stirrer and dropping funnel are placed a solution of 0.5 mol of sodium cyanide (technical cyan-egg) in 75 ml. of water, and 0.5 mol of methyl n-hexyl ketone. The flask was cooled in an ice bath, stirred vigorously, and 130 ml. of a saturated solution of sodium bisulfite was added to the mixture over a period of one and a half hours. Stirring was continued for a half hour after the addition of the bisulfite had been completed. The cyanohydrin layer was separated and dissolved in 200 ml. of absolute alcohol, to which 5 ml. of water had been added. This mixture was saturated with dry gaseous hydrogen chloride and refluxed for twenty hours. From time to time the ammonium chloride which separated was filtered off to prevent bumping. The excess alcohol was then removed by distillation from the steam bath, and the residue poured onto cracked ice. The resulting oil was taken up in ether, washed with a sodium carbonate solution, and distilled. The ethyl ester so obtained had a boiling point of from 131 to 133° C. under 35 mm. pressure. The corresponding acid, namely, α-n-hexyl-α-methyl-α-hydroxyacetic acid, obtained by hydrolyzing the ester, had a melting point of 40–41° C., and the p-toluidide of the acid had a melting point of 98–99° C.

The ester product so obtained may then be converted by the procedure outlined above to 5-methyl-5-n-hexyl-2,4-oxazolidinedione by reaction with urea.

*Example 7*

Ethyl α-n-heptyl-α-methyl-α-hydroxyacetate is prepared by substituting methyl n-heptyl ketone for the methyl n-hexyl ketone in Example 6. The ethyl ester so obtained has a boiling point of 103 to 104° C. under 3 mm. pressure, and of 138 to 140° C. under 20 mm. pressure. The corresponding acid has a melting point of 38 to 39° C. and a boiling point of 140 to 142° C. under 2 mm. pressure. The ester may be converted into 5-methyl-5-n-heptyl-2,4-oxazolidinedione by reaction with urea.

*Example 8*

Ethyl α-ethyl-α-cyclohexyl-α-hydroxyacetate is prepared as follows: Into a three-liter, three-necked flask, fitted with a mechanical stirrer, reflux condenser and dropping funnel, were placed 9.2 g. of magnesium turnings, 5 ml. of ethyl bromide and 25 ml. of anhydrous ether. A crystal of iodine was added, and after reaction had started, 250 ml. of ether were added. A mixture of 43 g. of ethyl cyclohexylglyoxalate (prepared as described in the following example), and 38 g. of ethyl bromide was then added dropwise through the separatory funnel, at such a rate as to cause the ether to reflux gently. This required about six hours. The flask was then heated by means of a water bath for one hour, and then allowed to stand over night at room temperature. The next morning the reaction mixture was cooled and decomposed by the slow addition of 150 ml. of 6N sulfuric acid, and an equal volume of water. The ethereal layer was separated, washed with sodium carbonate solution, and distilled. The fraction boiling at 132 to 141° C. under 20 ml. pressure was collected. This crude product was stirred with 100 ml. of a saturated sodium bisulfite solution, and allowed to stand for twenty-four hours. At the end of this time, the sodium bisulfite addition product of the unchanged ester was removed by filtration, and the hydroxy acid ester taken up in benzene. This was further purified by careful rectification through an efficient fractionating column. The boiling point of the ethyl α-ethyl-α-cyclohexyl-α-hydroxyacetate so obtained is 129 to 130° C. under 20 mm. pressure. The corresponding acid has a melting point of 136 to 137° C. The ester may be converted into 5-ethyl 5-cyclohexyl-2,4-oxazolidinedione by reaction with urea.

*Example 9*

Ethyl cyclohexylglyoxalate is prepared from cyclohexyl magnesium bromide and ethyl oxalate, by using the procedure described for the preparation of ethyl-α-keto-δ-methylcaproate. The ester obtained has a boiling point of 132 to 134° C. under 20 mm. pressure. The semicarbazone has a melting point of 153 to 154° C.

*Example 10*

α-Ethyl-α-hydroxy caprylamide is prepared as follows: Into a 500 cc. three-necked flask, cooled in an ice bath, and fitted with a mechanical stirrer, thermometer and dropping funnel, was placed a solution of sodium cyanide (28.5 g.) in water (105 ml.), ethyl-n-hexyl ketone (75 g.) and isopropyl ether (40 ml.). The flask was cooled to 4° C. and a solution of 28.5 g. of concentrated sulfuric acid in 40 ml. of water was added slowly over a period of two hours. The temperature was maintained between 0° and 4° C. during the addition. The oil layer which separated was poured with vigorous stirring into 100 ml. of concentrated sulfuric acid, which had been previously diluted with 10 cc. of water and cooled. This addition required twenty minutes and the temperature was maintained between −15° C. and −10° C. Stirring was continued for two hours with the temperature around 0° C., and then the reaction mixture was allowed to stand over night. The next morning the solution was poured onto cracked ice (800 g.) and the resulting oil taken up in isopropyl ether. After washing the ether extract with 5% sodium carbonate solution and with water, the ether was removed and the product solidified on cooling. It was finally recrystallized from benzene and petroleum ether mixture. A yield of 35 g. (35%) of product melting at 63–64° C. was obtained.

*Example 11*

α-Ethyl-α-hydroxy pelargonamide is prepared in the following manner: Into a 500 ml., three-necked flask, fitted with a stirrer, thermometer and dropping funnel, was placed a solution of sodium cyanide (14. g.) in water (55 ml.) and ethyl n-heptyl ketone (40 g.) in isopropyl ether (15 cc.). The flask was cooled in a dry ice-alcohol bath to 0° C. and a solution of concentrated sulfuric acid (16. g.) in water (25. ml.) was added over a two hour period. The temperature during the addition was kept between 0° C. and 5° C. The layer of oil was separated and to it was added, with stirring and cooling, concentrated sulfuric acid (55 ml.), which had been diluted with water (5.5 ml.) and cooled. The addition required 15 minutes, and the temperature was maintained between −15° C. and −10° C. Stirring was continued at 0° C. for two hours and the mixture allowed to stand over night at room temperature. The next morning it was poured onto cracked ice (500 g.) and the oil which separated taken up in isopropyl ether. After washing with 5% sodium carbonate solution it was distilled under reduced pressure. The fraction boiling between 145° C. and 155° C. at 3 mm. pressure was collected and amounted to 18 g. (36%). The colorless oil that was obtained solidified on standing and was crude α-ethyl-α-hydroxy pelargonamide. It melted at 49–50° C. The pure substance with a melting point of 55–56° C. could be obtained by recrystallization from benzene-petroleum ether mixture.

All of the oxazolidinedione compounds described above behave as mono-basic acids, and form salts with alkali and alkaline earth metal hydroxides or carbonates. These salts may be conveniently prepared merely by reacting an equivalent of the alkali or alkaline earth metal hydroxide or carbonate with the oxazolidinedione.

The 5-substituted 2,4-oxazolidinedione compounds prepared in accordance with the present invention have especially valuable hypnotic, sedative and narcotic properties. Moreover, it has been found that the efficient dose for their hypnotic or sedative effect is far less than a lethally toxic dose. These products may be used in any of the forms usually employed, for example, their solutions may be administered orally or by subcutaneous or intramuscular injection.

In view of the above, it will be seen that the several objects of the invention are achieved and other advantageous results attained.

As many changes could be made in the above substances and products without departing from the scope of the invention, it is intended that all matter contained in the above description shall be interpreted as illustrative and not in a limiting sense.

I claim.

1. A compound selected from the group consisting of 5-methyl-5-n-hexyl-2,4-oxazolidinedione, 5 - methyl-5-n-heptyl-2,4-oxazolidinedione, 5 - ethyl-5-cyclohexyl-2,4-oxazolidinedione, 5-ethyl-5-n-hexyl-2,4-oxazolidinedione, and 5-ethyl-5-n-heptyl-2,4-oxazolidinedione, said compound being prepared for use as a therapeutic.

2. The compound 5-methyl-5-n-heptyl-2,4-oxazolidinedione prepared for use as a therapeutic.

3. The compound 5 - ethyl-5-n-hexyl-2,4-oxazolidinedione prepared for use as a therapeutic.

4. The compound 5 - ethyl-5-n-heptyl-2,4-oxazolidinedione prepared for use as a therapeutic.

ROGER W. STOUGHTON.